April 19, 1927.
C. M. ANDERSON
FLOW METER
Filed Sept. 1, 1926 2 Sheets-Sheet 1
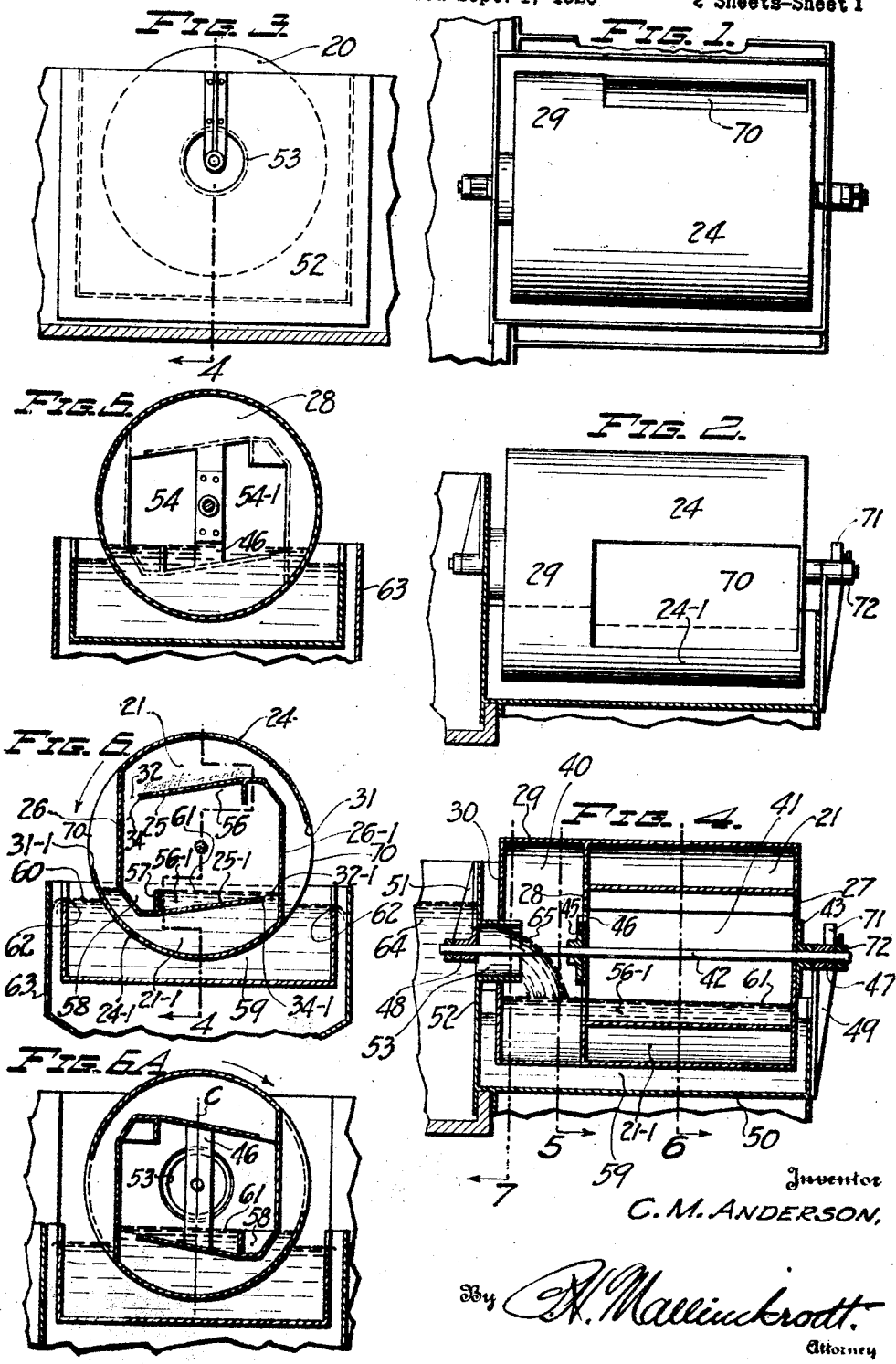
Inventor
C. M. ANDERSON,
By R. Mallinckrodt
Attorney April 19, 1927.
C. M. ANDERSON
1,625,583
FLOW METER
Filed Sept. 1, 1925
2 Sheets-Sheet 2
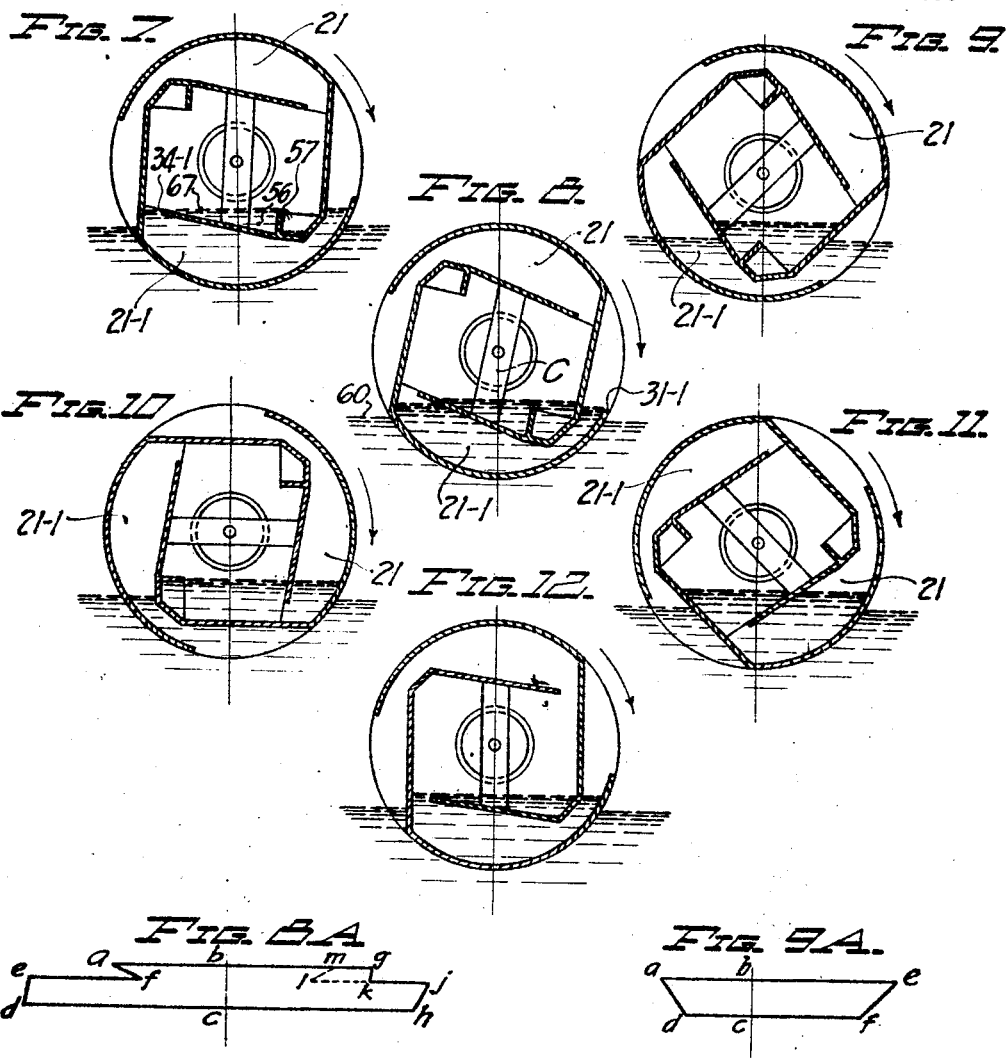
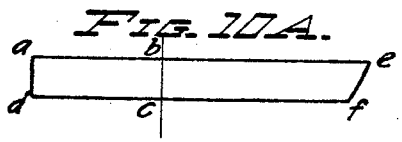 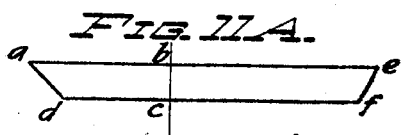
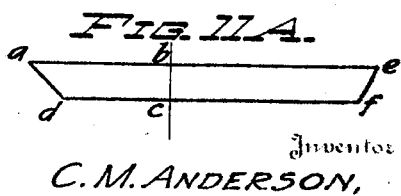
Inventor
C. M. ANDERSON,
By ℱ. ℋ. Mallinckrodt
Attorney Patented Apr. 19, 1927.

1,625,583

UNITED STATES PATENT OFFICE.

CHARLES M. ANDERSON, OF SALT LAKE CITY, UTAH.

FLOW METER.

Application filed September 1, 1926. Serial No. 133,069.

This invention relates to a flow meter for fluids, usually liquids, and is the identical one constituting the subject of my application for U. S. patent filed March 23, 1925, Serial No. 17,671, which said application became abandoned July 25, 1926.

The principal objects of the invention are:

First. To measure the flow, volumetrically, of a liquid in motion under a comparatively low head.

Second. To have extreme accuracy, and to maintain the same degree of accuracy whether the quantity of liquid flowing, is large or small.

Third. To allow no liquid to pass through the meter without registering the quantity.

Fourth. To have only one moving part, whose motion is purely rotary.

Fifth. To so construct the meter that it can be built practically in any size.

Sixth. To allow the meter to be partly submerged, and to derive the power for rotation from the small difference in head between the different levels of the liquid.

Seventh. Be simple, durable and efficient.

Eighth. Be low in cost.

Ninth. Be economical to install.

Tenth. Be automatic in its action.

In accomplishing these objects, I employ a rotor comprising a light cylindrical structure, usually of metal, this structure being divided along the axis thereof, into a receiving or supply compartment and a measuring compartment. The rotor may be mounted on a shaft carried in suitable bearings and may, or may not, be encased in a housing. An inlet communicating with a source of liquid, extends into the receiving compartment of the rotor, substantially concentric therewith. The inlet is located with reference to the level of the liquid to be measured, and the rotor is so arranged that the liquid discharged after measuring, due to the motion of the rotor, is allowed to escape at a level somewhat lower than the intake level.

Two or more bucket chambers or buckets, defined by suitable walls, are spaced equally around the axis of rotation in the measuring compartment, the buckets being arranged for filling in consecutive order from the supply compartment, with which the measuring compartment stands in communication. The buckets do not lift any liquid, but simply allow the liquid to flow through, thereby receiving a small amount of motive power due to the gravity of a part of the flowing liquid. In proximity to each bucket is a pocket which acts as a float to retard the motion of the rotor just before the corresponding bucket is full.

When a liquid is allowed to run into the supply compartment of the rotor, it soon flows over into the measuring compartment, and begins filling one of the buckets. The rotor turns at a moderate speed until the bucket is full, at which time the rotor comes to rest momentarily to insure the complete and accurate gauging of the contents of the bucket. Then any slight increase in the level of the liquid in the supply compartment, causes an overflow into the balancing pocket, thereby throwing the rotor out of balance, and compelling the latter to resume rotation, thus operating to bring a certain lip portion of the bucket into position for cutting off precisely the amount of liquid flowing into the bucket. This amount is immediately thereafter discharged as a unit of quantity.

Each bucket may for convenience, be said to consist of two principal parts, namely, the measuring portion and the motive power controlling portion. The latter includes the float or balancing pocket and a channeled portion leading to the same from the supply compartment. The channeled portion lies adjacent the balancing pocket and conducts the liquid along a weir so that the liquid when a certain depth is reached, may be caused to overflow into the balancing pocket. When the point in the revolution of the bucket has been reached where the liquid overflows the weir, the overbalancing of the rotor brings the separating lip into action, and causes the liquid contained at that instant in the channel portion, to flow over into the next bucket, while the liquid which is contained in the measuring portion is allowed to run out into the discharge basin or channel. The same action is then repeated for the next bucket, and so on indefinitely.

By the action just described, the balancing pocket acts as a float to retard the motion of the rotor just before the corresponding bucket is full. In a modified form of this invention, the balancing pocket may be omitted, but this results in a less accurate gauging of the unit quantities measured.

The features of this invention for which the protection of Letters Patent is desired, are collectively grouped in the claims concluding this specification.

In the drawings which illustrate one embodiment of this invention:

Fig. 1 represents a plan;
Fig. 2, a side elevation;
Fig. 3, an end elevation;
Fig. 4, a longitudinal vertical section on line 4, in Figs. 3 and 6;
Figs. 5 and 6, vertical cross-sections on lines 5 and 6 in Fig. 4 looking in the direction of the arrows;
Fig. 6$^A$, a similar section on line 6 in Fig. 4, but looking in the direction opposed to the arrow;
Figs. 7, 8, 9, 10 and 11, fragmentary cross-sections somewhat diagrammatic, corresponding to Fig. 6$^A$, showing different operative positions of the rotor;
Fig. 12, a fragmentary diagrammatic cross-section of a modified construction of the rotor: and
Figs. 8$^A$, 9$^A$, 10$^A$ and 11$^A$, diagrams enlarged, representing outlines of the spaces occupied by the liquid above a certain level in the positions of the rotor shown in Figs. 8, 9, 10 and 11 respectively.

Referring to the drawings, 20 indicates the rotor having in this instance two bucket spaces or briefly, buckets, 21 and 21$^1$. The buckets 21 and 21$^1$ are defined by the cylindrical wall portions 24 and 24$^1$, the partition walls 25 and 25$^1$, and the side walls 26 and 26$^1$, respectively. The cylindrical portions 24 and 24$^1$ extend from the end head 27 to the intermediate head 28, while the cylindrical shell 29 extends from the intermediate head 28 to the end head 30. The shell 29 is continuous around the circumference of the cylinder, while the cylindrical portions 21 and 21$^1$ are separated by the gaps or openings 70, thus forming the lips 31 and 31$^1$. The space between the lip 31 and the wall 26$^1$, and the space between the lip 31$^1$ and the wall 26, constitute respectively the discharge passages from the buckets 21 and 21$^1$. The buckets are filled from the channels 56 and 56$^1$ through the passages 32 and 32$^1$, the liquid flowing over the lips 34 and 34$^1$, respectively.

The intermediate head 28 divides the rotor into the receiving or supply compartment 40, and the bucket or measuring compartment 41. The rotor is rigidly mounted on the shaft 42 by means of the flange 43 attached to head 27, and the flange 45 attached to the spoke 46 of the head 28. The shaft 42 is rotatably mounted in the journals 47 and 48. The journal 47 may form an integral part of the bracket 49 rigidly attached to the pan 50, and the journal 48 may be an integral part of the bracket hanger 51, fastened to the wall 52 of the intake structure. The intake sleeve or spout 53 may be integral with the wall 52, and be concentric with the rotor, exterior to the shaft thereof. Liquid to be measured may flow through the spout from a tank or flume 64. The spout 53 projects through the head 30 of the rotor transversely to the plane of rotation thereof, and is arranged to discharge liquid into the supply compartment 40 as indicated at 65 in Fig. 4. Communication between the supply compartment 40 and the bucket compartment 41 is established by means of the openings 54 and 54$^1$, Fig. 5, extending through the intermediate head 28.

Liquid from the supply compartment is conducted through the channel 56$^1$ along the weir 57, as indicated in Figs. 4 and 6, the liquid being allowed to flow over into the balancing pocket 58 when the proper level has been reached by the liquid.

The lower part of the rotor extends into the basin 59 in which it may be submerged to the desired depth. The level of submersion in the present instance, is indicated at 60, and this level must be below the level 61 of the top of the weir 57 when in the position indicated in Fig. 6. The difference in the levels 60 and 61 is so arranged as to give the motive power desired for the rotor. The overflow lips 62 of the basin 59 are arranged to maintain the desired level 60, and the measured liquid discharged over the lips 62 may be caught in a discharge vessel 63 or other contrivance, and disposed of as desired.

Operation.

We will suppose the rotor to be in the position indicated in Fig. 6$^A$ where the liquid has just reached the level 61 flush with the upper edge of the balancing pocket weir. In this position, all the liquid inside the rotor, above the level 60, is disposed exactly equal on each side of the center line C, and the rotor has been brought to rest momentarily by the action of the balancing pocket 58, which being full of air at present, acts as a float. However, as the liquid rises above the level 61, it overflows into the pocket 58 and throws the rotor out of balance, causing the rotor to move in the direction of the arrow. After a very slight travel, the rotor reaches the position shown in Fig. 7, where the lip 34$^1$ is just rising above the level 67. Before this, communication between the channel space 56 and the bucket space 21$^1$, was possible, but now, as the lip rises above the level 67, this communication is cut off. As more water flows over the weir 57, the rotor gradually comes to the position shown in Fig. 8, where the level of the liquid in the bucket 21$^1$ is just ready to overflow the lip 31¹, at which point the discharge of the contents of the bucket begins. Now, as more liquid enters the measuring compartment, the rotor assumes the position shown in Fig. 9. As still more liquid enters the measuring compartment, the position shown in Fig. 10 is assumed by the rotor, then the position shown in Fig. 11, and finally the rotor again comes to the position indicated in Fig. 6ᴬ, this time however, the bucket 21 is the one to be in the submerged position. The action just described for the bucket 21¹, is repeated for the bucket 21, and alternated indefinitely.

The motive power for the rotor is supplied by the gravity of the liquid passing through the rotor from the level in the supply compartment indicated in Fig. 4, to the level 60 in the discharge basin. The positions assumed by that portion of the liquid in the measuring compartment, above the level 60 of the submerging liquid in the basin, divide that portion into unequal parts on each side of the vertical center line of the rotor in all positions of the rotor, excepting the one position indicated in Fig. 6ᴬ.

In Fig. 8ᴬ, $abcdefa$ indicates the area of the cross-section of the liquid to the left of the center line C in Fig. 8, while $gbchjkg$, indicates the area of the cross-section of liquid to the right of the center line C in Fig. 8. By superposing the portion $abcdefa$, upon the portion $gbchjkg$, it will be found that they are practically equal with the exception of the small area $gklm$, this latter area representing the over-balancing portion of the liquid to the right of the center line; hence, the rotor will have motion in the direction of the arrow in Fig. 8. In Fig. 8ᴬ, the area of the portion $abcfe$ is evidently greater than the area of the portion $abcda$, therefore in Fig. 9 the motion of the rotor continues in the direction of the arrow. Similarly, in Figs. 10ᴬ and 11ᴬ, the area of the portions $ebcfe$ respectively, are greater than the areas of the portions $abcde$, hence the rotative action continues as indicated by the arrows in Figs. 10 and 11.

From the position of the rotor indicated in Fig. 11, the rotative effect, as just described, is reduced to zero by the time the rotor reaches the position indicated in Fig. 6ᴬ where the buoyancy of the air in the balancing pocket asserts its retarding effect upon the motion of the rotor. The angular position of the rotor indicated in Fig. 9, is 45 degrees removed from the position indicated in Fig. 6ᴬ, and in Figs. 10 and 11 the angular positions are advanced respectively 45 degrees and 90 degrees from the position indicated in Fig. 9.

In Fig. 12 is shown a form of rotor without the balancing pocket 58. In general, the action of this rotor is similar to the one previously described, though the retarding effect just before the bucket is completely filled, is absent, and therefore the accurate gauging of the liquid flowing into the bucket, is not obtained.

In order to record the quantity of liquid passing through the meter, a suitable counter 71, of any well known manufacture, may be mounted so as to be actuated by a moving part of the rotor, for instance the collar 72, fast on the shaft 42.

While a specific embodiment of this invention is herein shown and described, it is to be clearly understood that all the detailed parts thereof, may, or may not, be shown in the preferred forms, and further that the preferred forms may be varied from time to time, as the development of this invention and the arts to which it appertains, progress. Therefore, that which forms an essential and characteristic part of this invention will be readily discernible from the claims in which its spirit is broadly generalized.

Having fully described my invention, what I claim is:

1. A flow meter comprising a rotor having measuring buckets spaced around the axis thereof, a walled liquid supply compartment arranged longitudinally adjacent said buckets, means for conducting liquid from said compartment to said buckets, and balancing pockets arranged to retard the action of said rotor each time a measuring bucket registers with the level of a liquid flowing through the said rotor.

2. A flow meter comprising a rotor having a liquid supply compartment and a measuring compartment in communication therewith, a basin in which the rotor is arranged to operate, means for discharging liquid from the measuring portion into the basin, means for causing the discharging liquid to impart motion to the rotor, and balancing pockets arranged for retarding the motion of the said rotor at predetermined points.

3. A flow meter comprising a rotor, a basin containing liquid partially submerging the rotor, means for establishing an unbalanced condition of the rotor relatively to the vertical center line thereof due to liquid flowing through the rotor at a higher level than the liquid level maintained in the basin, and balancing pockets disposed in the said rotor in radial relation to the axis thereof.

4. A liquid measuring compartment rotatably mounted, comprising walled bucket spaces having intake portions; a walled liquid supply compartment arranged longitudinally adjacent said bucket spaces, means for conducting liquid from said supply compartment to said bucket spaces, and balancing pockets in proximity to the bucket spaces with channeled portions intermediate said intake portions and said balancing pockets.

5. A flow meter having a rotatable measuring compartment, means for supplying liquid to the said compartment, a basin arranged to partially submerge said compartment, a walled passage arranged to discharge liquid from said compartment to said basin, and floats radially disposed around the axis of rotation of the measuring compartment.

6. A liquid-measuring compartment comprising walled buckets having intake portions, means for rotatably mounting said compartment, a liquid-supply member axially adjacent said measuring compartment, means for conducting liquid from said supply member to said buckets, balancing pockets having weirs in proximity to the said bucket spaces, and channeled portions intermediate the said intake portions and the said weirs.

7. A basin, a plurality of wall measuring compartments spaced around an axis, means whereby said compartments are rotatably mounted in operative relation to said basin, means for supplying liquid to the said compartments, a walled passage leading from said compartments into said basin, and floats arranged for operatively balancing said compartments relatively to said axis.

8. A basin, walled measuring compartments spaced around an axis, means whereby said compartments are rotatably mounted in operative relation to said basin, means for supplying liquid to the said compartments, walled passages leading from said compartments into said basin, and floats arranged for intermittently balancing said compartments relatively to said axis.

9. A rotor having a supply compartment, buckets spaced around the axis thereof, the said buckets being axially adjacent the supply compartment, and balancing pockets arranged in proximity to said buckets.

10. A rotor comprising end heads and an intermediate head, an unbroken cylindrical shell portion extending from one end head to the intermediate head, thereby defining a liquid supply compartment, broken cylindrical shell portions extending from the intermediate head to the other end head, side walls and partition walls extending inwardly of the rotor from the said broken shell portions thereby defining buckets, balancing pockets in proximity to said buckets, means for conducting liquid from the supply compartment into said buckets, and means for causing the liquid to begin overflowing into a balancing pocket at substantially the same instant that the corresponding bucket is filled with liquid.

11. A flow meter comprising a hollow rotor, a shaft on which said rotor is mounted, and an intake member arranged to conduct liquid into said rotor, the direction of flow through the intake member being transverse to a plane, said plane being perpendicular to the axis of rotation of the said rotor, and the said intake member being exterior to the said shaft.

12. A flow meter comprising a hollow rotor, a shaft on which said rotor is mounted, and an intake member arranged to conduct liquid into said rotor, the direction of flow through the intake member being transverse to a plane, said plane being perpendicular to the axis of rotation of the said rotor, and the said intake member being substantially concentric with, and exterior to, the said shaft.

In testimony whereof, I sign my name hereto.

CHARLES M. ANDERSON.